Patented June 17, 1941

2,246,071

UNITED STATES PATENT OFFICE 2,246,071

WATER-SOLUBLE CONDENSATION PRODUCTS

Heribert Schüssler, Cologne, Heinrich Morschel, Leverkusen - Wiesdorf, and Wilhelm Meiser, Munich, Germany, assignors to General Aniline & Film Corporation, a corporation of Delaware No Drawing. Application October 4, 1939, Serial No. 297,864. In Germany October 15, 1938

7 Claims. (Cl. 260—507)

The present invention relates to water-soluble condensation products of arylamides of aromatic o-hydroxycarboxylic acids and to a process of preparing these condensation products. The new water-soluble condensation products correspond to the following general formula:

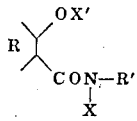

In this formula R stands for an aromatic radical such as benzene, naphthalene, tetrahydronaphthalene, anthracene, carbazole, diphenylene oxide, diphenylene sulfide, fluorene and the like including substitution products thereof, R' stands for an aromatic radical of the benzene or naphthalene series, X stands for an acyl residue which contains at least one salt-forming group, such as a carboxylic or sulfonic group or at least one quaternary ammonium group, and X' stands for an acyl residue which may also contain a solubilizing group, e. g. for acetyl, propionyl, benzoyl, toluenesulfonyl and the like or for the acyl residue X.

The new condensation products can be obtained by interacting arylamides of aromatic o-hydroxycarboxylic acids or the derivatives thereof already acylated in the hydroxy group, with acylating agents in the presence of a tertiary base, the acylating agents being selected in such a manner that they contain besides the acylating group at least one solubilizing residue such as a carboxylic or sulfonic acid group or a residue which can be converted into a quaternary ammonium group.

As acylating agents may be used the halides or anhydrides of organic carboxylic acids which contain at least a further salt-forming group, such as the carboxylic or sulfonic acid group, or a residue which can be converted into a quaternary ammonium group. Such compounds are the halides or anhydrides of polycarboxylic acids, sulfocarboxylic acids, further carboxylic acid halides containing a dialkylamino group or an ω-chloroalkyl group which groups can be converted, after the condensation has taken place, in a known manner into quaternary ammonium groups, or are converted into quaternary ammonium compounds during the condensation respectively. The acylating agents can be employed as isolated products and also as technical crude products, as they are obtained, for instance, by the action of phosphorus halides upon the corresponding acids or by the action of chlorosulfonic acids or sulfuric anhydride upon the corresponding carboxylic acid derivatives.

As tertiary base in which the reaction of the arylamides of the aromatic o-hydroxycarboxylic acids with the acylating agents takes place, preferably pyridine and its homologues are used. However, other tertiary bases may be employed. Also indifferent solvents may be added to the reaction mixture.

As mentioned above besides the arylamides of aromatic o-hydroxycarboxylic acids themselves also the derivatives thereof may be used the hydroxy group of which is already acylated. In this case it is of no importance whether the O-acyl residue contains already a solubilizing group or not. Those O-acyl groups are residues of aliphatic or aromatic carboxylic or sulfonic acids, further residues such as —OCOY and OCNH₂ or OCNHY, wherein Y means a hydrocarbon radical.

The new condensation products possess a good solubility in water and are valuable intermediates for the manufacture of dyestuffs.

The following examples illustrate the invention without being restricted thereto, the parts being by weight.

Example 1

58.6 parts of 1-(2'-hydroxynaphthalene-3'-carboylamino)-2-methoxybenzene and 96 parts of benzoic acid-3-sulfo chloride are refluxed with 200 parts of dry pyridine for two hours. Thereupon the pyridine is distilled off in vacuo, the residue is dissolved in water and salted out by adding sodium chloride. After isolating and drying the condensation product is obtained as a pulverizable solid. It is easily soluble in water and corresponds in its free state to the following formula:

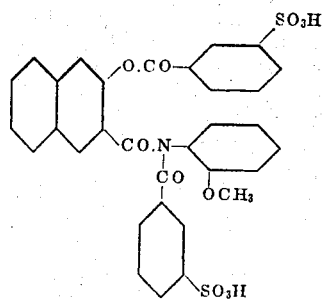

The benzoic acid 3-sulfochloride has reacted in this and in the following examples as if it were 3-sulfo-beznoylchloride.

Example 2

To 500 parts of pyridine 330 parts of benzoic acid-3-sulfochloride are added, the mixture becomes warm but the temperature is not allowed to rise above 70° C. After a short time crystals separate and a thick paste of crystals is formed. Thereupon 305 parts of 2'-acetoxynaphthalene-3'- carboyl-aminobenzene are added and the mixture is heated to 70° C. for 8 hours. When cold the reaction mass is poured into 1000 parts of cold water. Now 100 parts of sodium chloride are added with stirring and the supernatant aqueous layer is removed. The remaining condensation product is dissolved in 6000 parts of water of 50° C., filtered, if desired, and precipitated by adding 300 parts of sodium chloride. It separates in a semi-solid form. When isolated and dried it is obtained as a solid. It corresponds in its free state to the following formula:

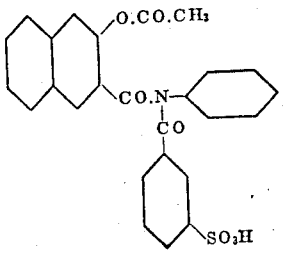

In analogous manner a water-soluble condensation product is obtained from 1-(2'-acetoxynaphthalene-3'-carboylamino) - 2 - methoxybenzene and benzoic acid-3-sulfo chloride in pyridine.

Example 3

84 parts of 1-(2'-acetoxynaphthalene-3'-carboylamino)-2-methoxybenzene are heated in 85 parts of pyridine with 110 parts of benzoic acid-disulfo chloride for four hours to 90–95° C. The reaction product is worked up in the manner described in Example 2. A product is obtained which is easily soluble in water and corresponds in its free state to the following formula:

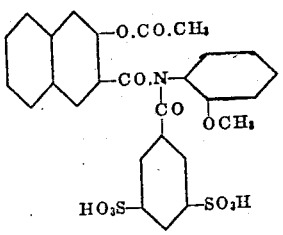

Example 4

Into 125 parts of pyridine 103.4 parts of 4-chloromethylbenzoyl chloride are introduced and after 20 minutes 167.5 parts of 1-(2'-acetoxynaphthalene-3'-carboylamino)-2 - methoxybenzene are added whereby self-heating to about 90° C. occurs. The reaction mixture is now kept for 8 hours at the temperature of 90° C. Thereupon most of the pyridine is distilled off in vacuo and the residue is dissolved in the necessary amount of cold water (complete solution). By adding so much of hydrochloric acid that the mixture shows acid reaction to Congo red paper and some sodium chloride the reaction product can easily be separated in filtrable form. After isolating and drying a solid product is obtained which is easily soluble in water and which corresponds to the following formula:

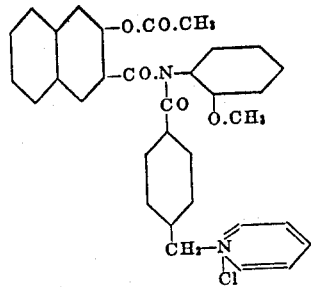

In a similar way the components shown in the following table are condensed to water soluble products:

| | Arylamide | Acylating agent |
|---|---|---|
| 1 | 2'-benzoyloxybenzene-1'-carboylamino-benzene. | Benzoic acid-3-sulfochloride. |
| 2 | 4,4'-di-(2''-methoxyacetoxy-5''-methyl-benzene-1''-carboylamino)-3,3'-dimethoxy-diphenyl. | Do. |
| 3 | 1-(2'-acetoxy-5',6',7',8'-tetrahydronaphthalene-3'-carboylamino)-naphthalene. | Do. |
| 4 | 2'-benzoyloxynaphthalene-3'-carboylamino-benzene. | Do. |
| 5 | 1-(2'-acetoxynaphthalene-3'-carboylamino)-2-methoxybenzene. | 3-sulfobenzoic acid-dichloride. |
| 6 | 1-(2'-acetoxynaphthalene-3'-carboylamino)-4-methoxybenzene. | Reaction product of benzoylchloride with sulfuric anhydride. |
| 7 | 1-(3'-acetoxydiphenylene-sulfide-2'-carboylamino)-2-methoxy-benzene. | Benzoic acid-3-sulfochloride. |
| 8 | 1-(3'-propionyloxydiphenyleneoxide-2'-carboylamino)-2-methoxybenzene. | Do. |
| 9 | 2'-acetoxyanthracene-3'-carboylamino-benzene. | Do. |
| 10 | 1-(2'-benzene-sulfonyloxynaphthalene-3'-carboylamino)-2-methoxy-benzene. | Do. |
| 11 | 1-(1',2'-1'',2''-benzo-5''-acetoxycarbazole-4''-carboylamino)-2-methyl-4-methoxybenzene. | Do. |

We claim:

1. As new products water-soluble condensation products of the general formula:

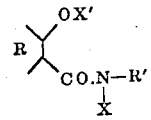

wherein R stands for an aromatic radical, R' stands for an aromatic radical selected from the group consisting of the benzene and naphthalene series, X stands for an acyl residue containing at least one water-soluble ionizing group selected from the class consisting of the carboxyl group, the sulfonic group and quaternary ammonium groups, and X' stands for an acyl residue.

2. As new products water-soluble condensation products of the general formula:

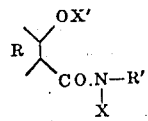

wherein R stands for an aromatic radical, R' stands for an aromatic radical selected from the group consisting of the benzene and naphthalene series, X stands for an aroyl residue containing at least one water-soluble ionizing group selected from the class consisting of the carboxyl group, the sulfonic group and quaternary ammonium compounds, and X' stands for an acyl residue.

3. As new products water-soluble condensation products of the general formula:

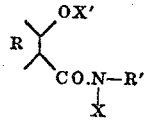

wherein R stands for an aromatic radical, R' stands for an aromatic radical selected from the group consisting of the benzene and naphthalene series, X stands for a benzoyl residue containing at least one water-soluble ionizing group selected from the class consisting of the carboxyl group, the sulfonic group and quaternary ammonium groups, and X' stands for an acyl residue.

4. As new products water-soluble condensation products of the general formula:

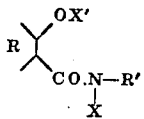

wherein R stands for an aromatic radical, R' stands for an aromatic radical selected from the group consisting of the benzene and naphthalene series, X stands for a benzoyl residue containing at least one water-soluble ionizing group selected from the class consisting of the carboxyl group, the sulfonic group and quaternary ammonium groups, and X' stands for an acyl residue of a fatty acid.

5. As new products water-soluble condensation products of the general formula:

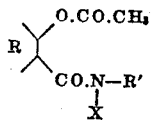

wherein R stands for an aromatic radical, R' stands for an aromatic radical selected from the group consisting of the benzene and naphthalene series, and X stands for a benzoyl residue containing at least one water-soluble ionizing group selected from the class consisting of the carboxyl group, the sulfonic group and quaternary ammonium groups.

6. As new products water-soluble condensation products of the general formula:

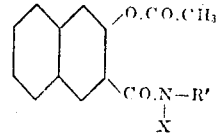

wherein R' stands for an aromatic radical selected from the group consisting of the benzene and naphthalene series and X stands for a benzoyl residue containing at least one water-soluble ionizing group selected from the class consisting of the carboxyl group, the sulfonic group and quaternary ammonium groups.

7. As new products water-soluble condensation products of the general formula:

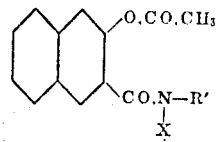

wherein R' stands for an aromatic radical selected from the group consisting of the benzene and naphthalene series and X stands for a sulfobenzoyl residue.

HERIBERT SCHÜSSLER.
HEINRICH MORSCHEL.
WILHELM MEISER.